(12) United States Patent
Younger

(10) Patent No.: US 6,871,397 B2
(45) Date of Patent: Mar. 29, 2005

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 295 days.

(21) Appl. No.: 10/081,605

(22) Filed: Feb. 21, 2002

(65) Prior Publication Data

US 2004/0214679 A1 Oct. 28, 2004

(51) Int. Cl.$^7$ .............................. B23P 6/00; B23P 23/00; F16H 31/00
(52) U.S. Cl. ............................. 29/888.011; 29/401.1; 29/402.03; 29/402.08; 475/120; 477/142
(58) Field of Search ................... 29/889.1, 401.1, 29/402.03, 402.08, 402.04, 888.011; 475/120, 142, 127, 130; 477/137, 142

(56) References Cited

U.S. PATENT DOCUMENTS

| | | | | |
|---|---|---|---|---|
| 4,023,447 A | * | 5/1977 | Sakai et al. | 477/136 |
| 5,540,628 A | * | 7/1996 | Younger | 475/120 |
| 5,624,342 A | * | 4/1997 | Younger | 475/127 |
| 5,730,685 A | * | 3/1998 | Younger | 477/156 |
| 5,743,823 A | * | 4/1998 | Younger | 475/120 |
| 5,768,953 A | * | 6/1998 | Younger | 74/606 R |
| 5,820,507 A | * | 10/1998 | Younger | 475/116 |
| 5,967,928 A | * | 10/1999 | Younger | 475/120 |
| 6,099,429 A | * | 8/2000 | Younger | 475/120 |
| 6,117,047 A | * | 9/2000 | Younger | 477/130 |
| 6,287,231 B1 | * | 9/2001 | Younger | 475/120 |

OTHER PUBLICATIONS

4R100 Transmission—Theory And Operation Ford Motor Company, 2000.

* cited by examiner

Primary Examiner—Marc Jimenez
(74) Attorney, Agent, or Firm—Mark P. Stone

(57) ABSTRACT

The present application is directed to methods and systems for improving the operation of transmissions for automotive vehicles, and in particular, the "factory installed" automotive transmission installed by an original automobile manufacturer. The methods and systems modify both the structural components and hydraulic circuitry of an original automotive transmission to adjust applied pressure and shifting patterns to improve the efficient operation of the automotive transmission.

20 Claims, 2 Drawing Sheets

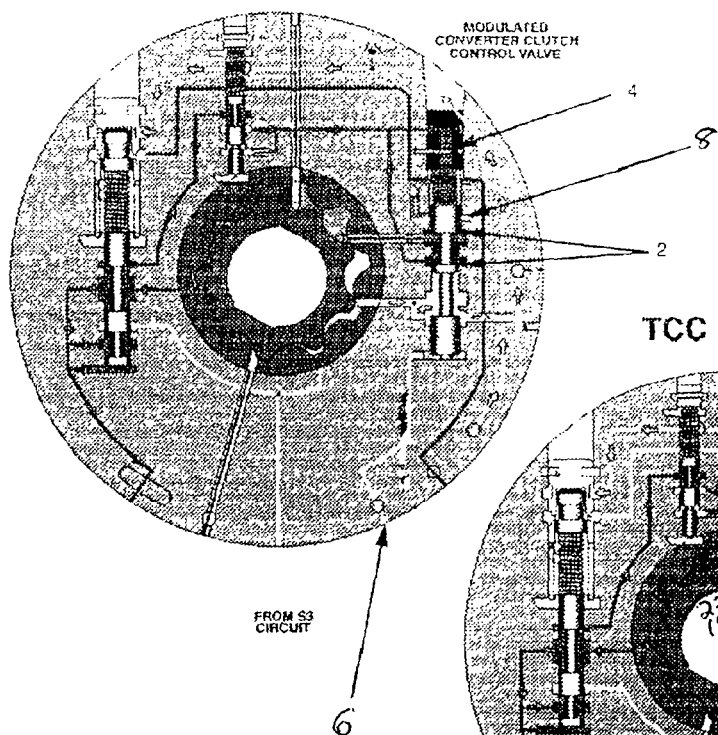
TCC RELEASE - FIG. 1 (Prior Art)
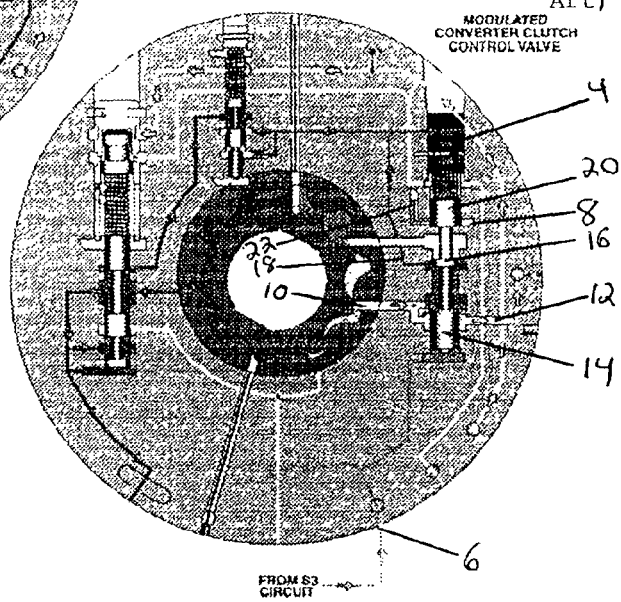
TCC APPLY - FIG. 2 (Prior Art)

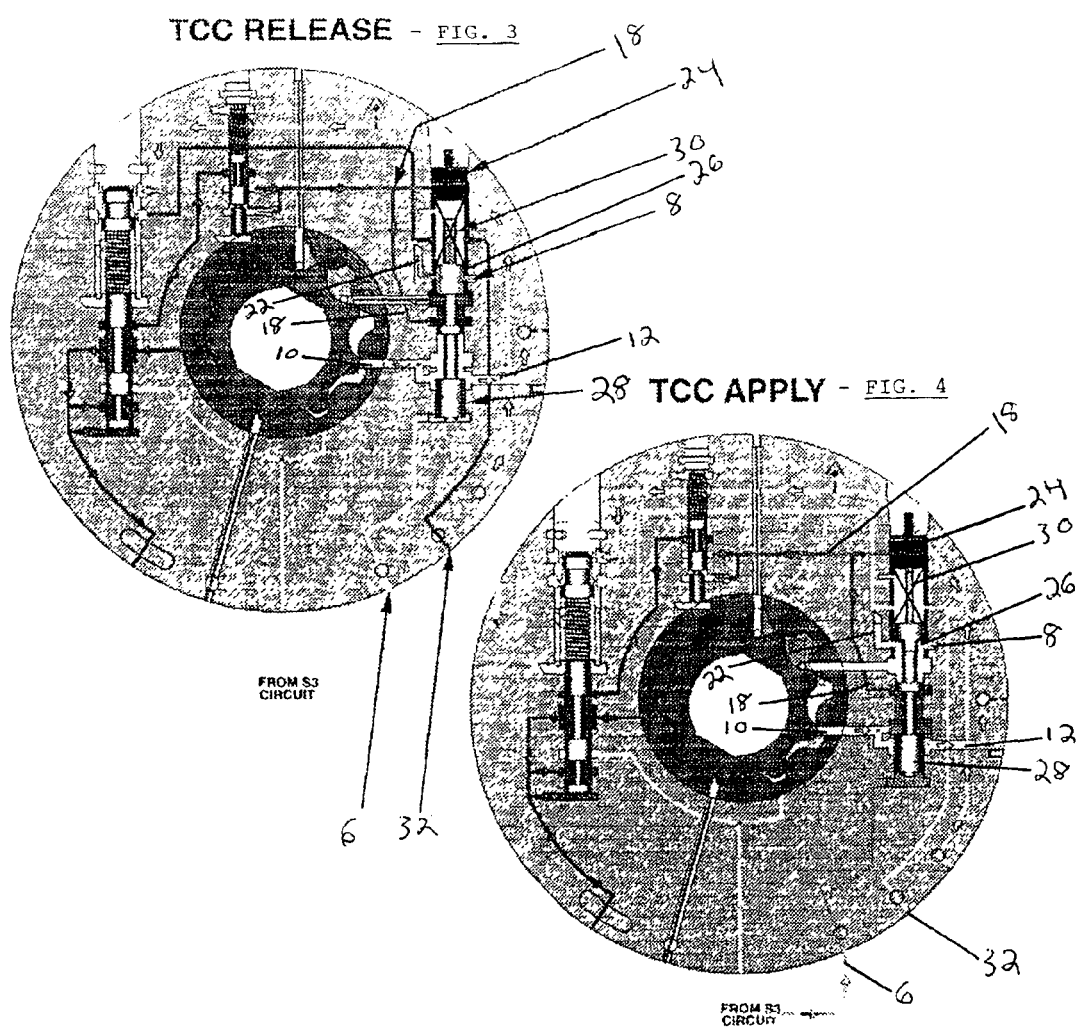

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles of the type installed by the original equipment manufacturers, commonly referred to as "factory installed". The invention is particularly directed to the improvement and modification of the "factory installed" automotive transmission commonly known as the "4R100" installed in motor vehicles manufactured by The Ford Motor Company of Dearborn, Mich.

The present inventor owns the following United States patents, the disclosure of each of which is expressly incorporated by reference into the present patent application: U.S. Pat. No. 4,449,426, issued on May 26, 1984; U.S. Pat. No. 4,711,140, issued on Dec. 8, 1987; U.S. Pat. No. 4,790,938, issued Dec. 13, 1988; U.S. Pat. No. 5,253,549, issued Oct. 19, 1993; U.S. Pat. No. 5,540,628, issued Jul. 30, 1996; U.S. Pat. No. 5,624,342, issued Apr. 29, 1998; U.S. Pat. No. 5,730,685, issued Mar. 24, 1998; U.S. Pat. No. 5,743,823, issued Apr. 28, 1998; U.S. Pat. No. 5,768,953 issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; and U.S. Pat. No. 6,287,231, issued Sep. 11, 2001.

The components and operation of the "factory installed" 4R100 automotive transmission are fully disclosed and illustrated in a publication entitled "4R100 *Reference Manual, Theory And Operation*, Copyright 2000, published by The Ford Motor Company. The disclosure of this publication is expressly incorporated by reference into the present patent application.

The hyrdralic circuitry of the "factory installed" 4R100 automotive transmission is designed so that an electronic solenoid controls the upward movement of a torque converter control valve which can take as long as seven second to reach its uppermost position. The slow upward movement of the torque converter control valve results in a relatively long period of time necessary for applying the converter clutch. This, in turn, results in undesirable glazing of the converter clutch friction material, and distorting of its mating surfaces as a result of excessive speed differential and heat buildup incurred as a result of the relatively long time period necessary to apply the clutch. This, in turn, causes partial misalignment of the clutch, resulting in slippage during upshifts which further decreases the useful life of the converter clutch friction material.

It is the primary objection of the present invention to provide methods and apparatus for modifying the "factory installed" 4L100 automotive transmission to decrease the time necessary for the torque converter control valve to move into its uppermost position, thereby decreasing the apply time of the converter clutch and reducing or eliminating the known disadvantages resulting from the relatively long apply time of the "factory installed" automotive transmission.

Other objects and advantages of the present invention will become apparent from the following discussion of the invention.

SUMMARY OF THE INVENTION

In accordance with the preferred embodiment of the present invention, a factory installed automotive transmission, and in particular the automotive transmission known as the "4R100" installed in automobiles manufactured by the Ford Motor Company, is modified to reduce the time required for applying the torque converter clutch by reducing the time required for the torque converter control valve to be moved into its uppermost position in response to an "ON" signal from an electronic control solenoid. Preferably, the apply time of the converter clutch will be reduced from the seven second interval of the "factory installed" transmission, to less than one second in the modified automotive transmission in accordance with the present invention.

In the preferred embodiments of the present invention, a balance valve which opposes the upward movement of the torque converter control valve in the 4R100 factory installed transmission, is removed, thereby reducing opposition to the upward movement of the torque converter control valve and decreasing the apply time of the converter clutch which corresponds to the time necessary for the torque converter control valve to move into its uppermost position. Additionally, the bushing or valve bore for the factory installed torque converter control valve is replaced by a new and longer bushing, which is oriented to partially block an exhaust oil passage in fluid communication with the valve bore of the factory installed transmission. Uncontrolled exhaust of converter oil through the exhaust passage in the factory installed transmission adversely affects the feel and firmness of the apply of the converter clutch. An orifice provided in the new valve bore is axially aligned with the exhaust passage of the factory installed transmission. The orifice has a smaller diameter than the diameter of the exhaust passage, thereby restricting the exhaust of fluid through the passage, and improving the feel and firmness of the application of the converter clutch. The size of the orifice can be adjusted to vary the feel of the converter clutch apply, as may be desired.

The modification of the components and hydraulics of the factory installed transmission in accordance with the present invention results in a faster apply time of the converter clutch in response to a signal from the electronic control solenoid, thereby reducing or eliminating the disadvantages resulting from the longer converter clutch apply time of the factory installed automotive transmission. Further modifications to the factory installed automotive transmission include replacing a return spring of the factory installed torque converter control valve with a stronger spring having a higher coefficient of tension, to increase the pressure of the regulated converter clutch charge oil, preferably from 140 pounds per square inch (psi) to 180 psi or greater, thereby further reducing the apply time of the converter clutch and increasing its ability to hold greater torque.

BRIEF DESCRIPTION OF THE DRAWINGS

FIG. 1 illustrates a portion of the hydraulic circuitry of a "factory installed" 4R100 automotive transmission during torque converter clutch release;

FIG. 2 illustrates a portion of the hydraulic circuitry of a "factory installed" 4R100 automotive transmission during torque converter clutch apply;

FIG. 3 illustrates the hydraulic circuitry of FIG. 1, modified in accordance with the present invention; and FIG. 4 illustrates the hydraulic circuitry of FIG. 2, modified in accordance with the present invention.

DESCRIPTION OF THE BEST MODES FOR CARRYING OUT THE INVENTION

FIGS. 1 and 2 schematically illustrate a portion of the hydraulic circuity for the "factory installed" 4R100 automotive transmission, and in particular illustrate the torque converter control (TCC) system of the "factory installed" 4R100 transmission. FIG. 1 illustrates the position of the torque converter control valve when the converter clutch is released, while FIG. 2 illustrates the postion of the torque converter control valve when the converter clutch is applied.

The torque converter control valve, having upper and lower lands of different diameter, is generally illustrated by reference numeral 2. The difference in the diameter of the lands assists in moving the valve in an upward direction as shown in FIG. 1. A bushing and a small diameter valve are located at the top of the torque converter control valve 2, at a location generally designated by reference numeral 4. This upper valve, in cooperation with a return spring, opposes upward movement of the valve 2 when it is urged upwardly by fluid pressure applied to the bottom of the valve 2 through a passageway 6. The flow of fluid applied to the bottom of the valve 2 through the passageway 6 to move the valve 2 in an upward direction is electronically controlled by a signal from a solenoid. An opening or exhaust, designated by reference numeral 8, is in fluid communication with the bore of the valve 2 to drain converter clutch front oil during operation of the "factory installed" transmission, as will be discussed below.

In operation of the 4R100 "factory installed" transmission, fluid pressure is applied to the bottom of the lower land of the valve 2 through passageway 6, in response to an activation signal from the control solenoid, to move the valve in an upward direction. Upward movement is opposed by both a return spring exerting an opposing force on the top end of the valve 2, and by a smaller diameter valve which receives regulated converter oil and is located above the top of the torque converter control valve 2 to oppose upward movement of the valve 2.

The operation of the torque converter control system of the factory installed 4R100 automotive transmission will be briefly discussed with respect to FIGS. 1 and 2. When the converter clutch is released (not applied), the torque converter control valve 2 is in its lowermost position, as illustrated by FIG. 1. In this position, the lower land 14 of the valve 2 permits converter clutch oil, introduced into the valve bore by passageway 10, to flow through passageway 12. Passageway 12 is in fluid communication with the front of the converter clutch, and converter oil flowing through passageway 12 applies pressure to the front of the converter clutch to maintain it in release (not apply). When the valve 2 is in its lower position illustrated by FIG. 1, land 16 blocks a fluid flow passageway 18, which is in fluid communication with the rear of the converter clutch, and land 20 blocks an exhaust 8.

When the converter clutch is to be applied, a signal from an electronic control solenoid causes fluid to flow through passageway 6, exerting pressure on the bottom of the lower land 14 of the torque converter control valve 2. The applied fluid pressure overcomes the opposing force applied to the valve 2 by the return spring and the upper balance valve, thereby causing the valve 2 to move upwardly into the position illustrated by FIG. 2. In this position, flow of converter oil through passageway 12 is blocked by the lower land 14, and the converter oil introduced through the passageway 10 and is re-routed to flow through passageway 18 which is no longer blocked by land 16. The converter oil flowing through passageway 18 is applied to the rear of the converter clutch resulting in the application of the converter clutch. When the valve 2 is in its upper position, the upper land 20 no longer blocks the exhaust 8 or a passageway 22 coupled to the passageway 12 through which converter oil is applied to the front of the converter clutch when the converter clutch is released. Therefore, converter oil in passageway 12 is drained through the passageway 22 and the exhaust 8 when the converter clutch is applied as illustrated by FIG. 2.

When the control signal from the solenoid is discontinued, fluid pressure is no longer applied to the bottom of the valve 2 through the passageway 6. When this occurs, the valve is returned to, and maintained in, its lowermost position as illustrated by FIG. 1, as a result of the action of a return spring and the smaller diameter balance valve urging the valve 2 into its lowermost position. It remains in its lowermost position as illustrated by FIG. 1 until another solenoid control signal is received and fluid pressure is again applied to the bottom of the valve 2 by fluid which is caused to flow through the passageway 6. The sequence of converter clutch apply and release continues to repeat in response to control signals generated by the electronic solenoid control. A more detailed disclosure of the operation of the factory installed 4R100 automotive transmission is found in the aforementioned Ford publication entitled 4R100 *Reference Manual, Theory And Operation*, the disclosure of which is expressly incorporated by reference herein.

In the "factory installed" 4R100 automotive transmission, it may take as long as six or seven seconds to apply the converter clutch. As a result of the relatively long and gradual apply time of the converter clutch of the "factory installed" 4R100 automotive transmission, over time, the friction material of the clutch will become glazed and its mating surfaces will become distorted as a result of excessive speed differential and buildup of heat incurred during the long, gradual time necessary to apply the converter clutch. Moreover, the clutch itself will become partially misaligned, resulting in slippage during upshifts, which further decreases the useful life of the converter clutch friction material.

FIGS. 3 and 4 illustrate modifications to the hydraulic circuitry of the "factory installed" 4R100 automotive transmission to minimize or eliminate the aforementioned disadvantages, and to generally improve the operation of the transmission. The modifications to the "factory installed" transmission in accordance with the present invention reduce the time necessary for the converter clutch valve to complete its upward movement in response to a signal from the control solenoid to reduce the apply time of the converter clutch to less than one second. Reduction of the converter clutch apply time reduces or eliminates the undesirable effects on the "factory installed" transmission, and the decrease in its useful operating life, resulting directly from the relatively long and gradual apply time for the converter clutch. Other modifications to the factory installed transmission in accordance with the present invention improve the firmness and feel of the apply of the converter clutch.

In accordance with a first aspect of the present invention, a new bushing or valve bore, designated by reference numeral 24, replaces the shorter bushing or valve bore for the torque converter control valve 28 of the "factory installed" transmission. The bushing 24 extends downwardly over the exhaust passageway (8) of the "factory installed" transmission, to cover the exhaust opening. A smaller diameter opening 26 is defined in the bushing in at least partial axial alignment with the exhaust 8 to restrict the size of the larger diameter exhaust opening. Preferably, the smaller diameter opening 26 in the new bushing 24 is 0.093 inches in diameter. In this manner, the flow of fluid through the exhaust 8 of the "factory installed" transmission when the converter clutch is applied is restricted, thereby controlling the rate of exhaust of front converter oil during apply of the converter clutch. This, in turn, improves the feel and firmness of the converter clutch apply. The size of the smaller diameter opening 26 in the new bushing 24 can be varied, at the selection of the user, to adjust the firmness of the apply of the converter clutch, as may be desired.

In a further aspect of the present invention, the balance valve of the "factory installed" transmission, which opposes upward movement of the factory installed torque converter control valve 2, is removed. As a result, there is less opposition to the upward movement of the torque converter control valve 2 in response to a command signal received from the electronic solenoid control. Reduction in the opposition to upward movement of the valve 2 decreases the time necessary for the valve to complete its upward movement, thereby decreasing the apply time of the converter clutch.

In a further aspect of the present invention, a new torque converter control valve, generally designated by reference numeral 28 in FIGS. 3 and 4 of the drawing, replaces the torque converter control valve 2 of the "factory installed" transmission. The new valve 28 has upper and lower lands which are of the same diameter. In valve 2 of the "factory installed" transmission, the upper and lower lands are of differing diameters to assist upward movement of the valve. Although the elimination of the differential in the diameters of the upper and lower lands of the replacement valve 28 will, to a limited extent, impede upward movement of the valve, this is necessary to compensate for the removal of the "factory installed" balance valve opposing upward movement of the "factory installed" torque converter control valve 2. The elimination of the differential in diameter of the upper and lower lands of the replacement torque converter control valve 28 in the modified transmission tends to stabilize the valve 28 during its upward movement, and prevents the valve 28 from moving upward too rapidly, or moving upwardly even in the absence of a command signal from the electronic solenoid control.

In a further aspect of the present invention, a stronger return spring, designated by reference numeral 30, replaces the return spring of the factory installed transmission. The replacement return spring 30, which is stiffer and has a higher tension coefficient than the return spring of the factory installed transmission, increases the fluid pressure of the converter clutch oil flowing through passageway 18 which is applied to the lower converter clutch during the apply of the converter clutch. The use of the stronger replacement return spring 30 in the modified transmission increases the ability of the converter clutch to hold more quickly, and to hold greater torque. The replacement spring 30 preferably has a coefficient of tension sufficient to increase the fluid pressure in passageway 18 from approximately 140 psi (pounds per square inch) in the "factory installed" transmission, to approximately 180 psi in the modified transmission.

Reference numeral 32 designates a passageway for fluid flow from reverse to lock out converter clutch apply when the transmission is in reverse gear. This hydraulic circuit prevents application of the converter clutch when the transmission is in reverse gear by applying fluid pressure to the top of the valve 28 to prevent upward movement of the valve.

The modifications to the "factory installed" 4R100 automotive transmission in accordance with the present invention significantly reduce the apply time of the converter clutch from approximately 6–7 seconds to less than 1 second. Reduction of the apply time reduces or eliminates slippage of the converter clutch and the generation of heat associated therewith, and glazing and distortion of the converter clutch friction material, each of which significantly reduces the useful life of the converter clutch. The modified transmission maintains the converter clutch fully applied during upshifts when the solenoid is regulated to a partial apply mode. Any command signal received from the electronic control solenoid causes complete upward movement of the torque converter clutch control valve, resulting in complete apply of the converter clutch in significantly less time than is possible in the "factory installed" automotive transmission.

Other objects and advantages within the scope of the present invention will become apparent to those skilled in the relevant art. Accordingly, the discussion of the preferred embodiments of the invention herein are intended to be illustrative only, and not restrictive of the scope of the invention, that scope being defined by the following claims and all equivalents thereto.

What is claimed is:

1. A method of modifying hydraulic circuitry of an automotive transmission including a torque converter control valve movable within a valve bore between a first predetermined lower position and a second predetermined upper position by the selective application of fluid beneath said torque converter control valve; said hydraulic circuitry including a valve opposing upward movement of said torque converter control valve between said first and second predetermined positions; the steps of said method comprising:

removing said valve opposing said upward movement of said torque converter control valve.

2. The method as claimed in claim 1, wherein said hydraulic circuitry includes a return spring opposing upward movement of said torque converter control valve between said first and second predetermined positions, the steps of said method comprising:

removing said return spring opposing upward movement of said torque converter control valve; and replacing said return spring with another return spring having a greater coefficient of tension.

3. The method as claimed in claim 1, wherein said torque converter control valve includes upper and lower lands of different diameters, the steps of said method comprising:

replacing said torque converter control valve with another torque converter control valve having upper and lower lands of substantially equal diameter.

4. The method as claimed in claim 1, wherein said hydraulic circuitry includes an exhaust having an opening of a predetermined diameter in fluid flow relationship with said valve bore; the steps of said method comprising:

modifying said exhaust to restrict fluid flow through said opening of said exhaust.

5. The method as claim in claim 4, wherein the step of modifying said exhaust to restrict fluid flow through said opening of exhaust comprises the steps of:

replacing said valve bore with a replacement valve bore, and defining an opening in said replacement valve bore, said opening having a diameter smaller than said predetermined diameter of said opening of said exhaust, said opening in said replacement bore being, at least in part, in axial alignment with said opening of said exhaust to restrict fluid flow through said exhaust.

6. The method as claim in claim 5, said method comprising the steps of:

modifying the size of said opening defined in said replacement bore for adjusting the flow of fluid through said opening of said exhaust.

7. A method of modifying hydraulic circuitry of a 4R100 automotive transmission including a torque converter control valve movable within a valve bore between a first predetermined lower position and a second predetermined upper position by the selective application of fluid beneath said torque converter control valve; said hydraulic circuitry including a valve opposing upward movement of said torque converter control valve between said first and second predetermined positions; the steps of said method comprising:

removing said valve opposing said upward movement of said torque converter control valve.

8. The method as claimed in claim 7, wherein said hydraulic circuitry includes a return spring opposing upward movement of said torque converter control valve between said first and second predetermined positions, the steps of said method comprising:

removing said return spring opposing upward movement of said torque converter control valve; and replacing said return spring with another return spring having a greater coefficient of tension.

9. The method as claimed in claim 7, wherein said torque converter control valve includes upper and lower lands of different diameters, the steps of said method comprising:

replacing said torque converter control valve with another torque converter control valve having upper and lower lands of substantially equal diameter.

10. The method as claimed in claim 7, wherein said hydraulic circuitry includes an exhaust having an opening of a predetermined diameter in fluid flow relationship with said valve bore; the steps of said method comprising:

modifying said exhaust to restrict fluid flow through said opening of said exhaust.

11. The method as claim in claim 10, wherein the step of modifying said exhaust to restrict fluid flow through said opening of said exhaust comprises the steps of:

replacing said valve bore with a replacement valve bore, and defining an opening in said replacement valve bore, said opening having a diameter smaller than said predetermined diameter of said opening of said exhaust, said opening in said replacement bore being, at least in part, in axial alignment with said opening of said exhaust to restrict fluid flow through said exhaust.

12. The method as claim in claim 11, said method comprising the steps of:

modifying the size of said opening defined in said replacement bore for adjusting the flow of fluid through said opening of said exhaust.

13. A method of modifying the hydraulic circuitry of an automotive transmission having a torque converter control valve movable in a valve bore between a first predetermined lower position and a second predetermined upper position by the selective application of fluid beneath said torque converter control valve, said hydraulic circuitry including a return spring opposing upward movement of said torque converter control valve; the steps of said method comprising:

removing said return spring opposing upward movement of said torque converter control valve; and replacing said return spring with another return spring having a greater coefficient of tension.

14. A method of modifying the hydraulic circuitry of a 4R100 automotive transmission having a torque converter control valve movable in a valve bore between a first predetermined lower position and a second predetermined upper position by the selective application of fluid beneath said torque converter control valve, said hydraulic circuitry including a return spring opposing upward movement of said torque converter control valve; the steps of said method comprising:

removing said return spring opposing upward movement of said torque converter control valve; and replacing said return spring with another return spring having a greater coefficient of tension.

15. A method of modifying the hydraulic circuitry of an automotive transmission having a torque converter control valve movable in a valve bore between a first lower predetermined position and a second upper predetermined position by the selective application of fluid beneath said torque converter control valve, said torque converter control valve having upper and lower lands of differing diameter; the steps of said method comprising:

replacing said torque converter control valve with a replacement torque converter control valve having upper and lower lands of substantially equal diameter.

16. A method of modifying the hydraulic circuitry of a 4R100 automotive transmission having a torque converter control valve movable in a valve bore between a first lower predetermined position and a second upper predetermined position by the selective application of fluid beneath said torque converter control valve, said torque converter control valve having upper and lower lands of differing diameter; the steps of said method comprising:

replacing said torque converter control valve with a replacement torque converter control valve having upper and lower lands of substantially equal diameter.

17. A method of modifying the hydraulic circuitry of an automotive transmission having a valve movable in a valve bore between a first predetermined lower position and a second predetermined upper position by the selective application of fluid beneath said valve, and an exhaust having an opening of a predetermined diameter coupled in fluid flow relationship with said valve bore; the steps of said method comprising:

replacing said valve bore with a replacement valve bore having an opening defined therein; said opening being of a smaller diameter than said predetermined diameter of said opening of said exhaust; at least a portion of said smaller opening in said replacement valve bore being in axial alignment with said opening of said exhaust to restrict the flow of fluid between said valve bore and said exhaust.

18. The method as claimed in claim 17, the steps of said method comprising:

modifying the size of said opening in said replacement valve bore to adjust the fluid flow between said valve bore and said exhaust.

19. A method of modifying the hydraulic circuitry of a 4R100 automotive transmission having a torque converter control valve movable in a valve bore between a first predetermined lower position and a second predetermined upper position by the selective application of fluid beneath said torque converter control valve, and an exhaust having an opening of a predetermined diameter coupled in fluid flow relationship with said valve bore; the steps of said method comprising:

replacing said valve bore with a replacement valve bore having an opening defined therein; said opening being of a smaller diameter than said predetermined diameter of said opening of said exhaust; at least a portion of said smaller opening in said replacement valve bore being in axial alignment with said opening of said exhaust to restrict the flow of fluid between said valve bore and said exhaust.

20. The method as claimed in claim 19, the steps of said method comprising:

modifying the size of said opening in said replacement valve bore to adjust the fluid flow between said valve bore and said exhaust.

* * * * *